United States Patent
Yang

(10) Patent No.: US 11,151,909 B1
(45) Date of Patent: Oct. 19, 2021

(54) LARGE ROLLABLE DISPLAY DEVICE AND METHOD FOR MANUFACTURING SAME

(71) Applicant: SAMSUNG ELECTRONICS CO., LTD., Suwon-si (KR)

(72) Inventor: Joon-hyun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 438 days.

(21) Appl. No.: 16/325,933

(22) PCT Filed: May 15, 2017

(86) PCT No.: PCT/KR2017/005002
§ 371 (c)(1),
(2) Date: Feb. 15, 2019

(87) PCT Pub. No.: WO2018/038353
PCT Pub. Date: Mar. 1, 2018

(30) Foreign Application Priority Data

Aug. 23, 2016 (KR) .......................... 10-2016-0106985

(51) Int. Cl.
*G09F 9/30* (2006.01)
*G06F 1/16* (2006.01)

(52) U.S. Cl.
CPC ............ *G09F 9/301* (2013.01); *G06F 1/1641* (2013.01); *G06F 1/1652* (2013.01)

(58) Field of Classification Search
CPC combination set(s) only.
See application file for complete search history.

(56) References Cited

U.S. PATENT DOCUMENTS

| 7,450,085 | B2 | 11/2008 | Thielemans et al. |
| 7,864,136 | B2 | 1/2011 | Matthies et al. |
| 7,965,258 | B2* | 6/2011 | Aoki ..................... G06F 1/1641 345/1.3 |
| 8,194,399 | B2* | 6/2012 | Ashcraft ............... G06F 1/1652 361/679.05 |
| 8,539,705 | B2* | 9/2013 | Bullister ............... G06F 1/1615 40/733 |

(Continued)

FOREIGN PATENT DOCUMENTS

| JP | 2006-106764 A1 | 4/2006 |
| KR | 10-2008-0091432 | 10/2008 |

(Continued)

OTHER PUBLICATIONS

International Search Report and Written Opinion of the International Searching Authority dated Aug. 8, 2017 from International Patent Application No. PCT/KR2017/005002, 25 pages.

*Primary Examiner* — Lisa Lea-Edmonds
(74) *Attorney, Agent, or Firm* — Staas & Halsey LLP

(57) ABSTRACT

A large rollable display device includes flexible display modules arranged spaced apart from each other at first intervals on a rear surface of a transparent cover. Each of the flexible display modules includes primary sub-flexible display modules arranged spaced apart from each other at second intervals on a rear surface of a primary flexible film, and each of the primary sub-flexible display modules includes secondary sub-flexible display modules that are arranged spaced apart from each other at third intervals on a rear surface of a secondary flexible film.

14 Claims, 16 Drawing Sheets

(56) References Cited

U.S. PATENT DOCUMENTS

| | | | |
|---|---|---|---|
| 9,288,870 B2 | 3/2016 | Kiryuschev et al. | |
| 9,640,516 B2 * | 5/2017 | Cope | H01L 25/0753 |
| 10,426,046 B2 * | 9/2019 | Hayk | H05K 5/0217 |
| 10,613,655 B2 * | 4/2020 | Yoon | G06F 3/0488 |
| 10,627,931 B2 * | 4/2020 | Chung | G06F 3/041 |
| 10,719,284 B2 * | 7/2020 | Yamazaki | G06F 1/1624 |
| 10,908,757 B2 * | 2/2021 | Hong | G06F 1/1652 |
| 2002/0196205 A1 * | 12/2002 | Yamakado | H01L 27/3293 345/33 |
| 2008/0013292 A1 * | 1/2008 | Slikkerveer | G06F 1/1615 361/749 |
| 2008/0144265 A1 * | 6/2008 | Aoki | H04M 1/0268 361/679.04 |
| 2014/0049464 A1 * | 2/2014 | Kwak | G06F 1/1652 345/156 |
| 2016/0014882 A1 * | 1/2016 | Jongman | H05K 1/028 361/749 |
| 2016/0027763 A1 | 1/2016 | Cope | |
| 2016/0034047 A1 * | 2/2016 | Lee | G06F 3/013 345/156 |
| 2016/0197134 A1 | 7/2016 | Jung et al. | |
| 2021/0004193 A1 * | 1/2021 | Yamazaki | G06F 3/0448 |

FOREIGN PATENT DOCUMENTS

| | | |
|---|---|---|
| KR | 10-1624101 B1 | 5/2016 |
| KR | 10-2016-0084791 | 7/2016 |

\* cited by examiner

LARGE ROLLABLE DISPLAY DEVICE AND METHOD FOR MANUFACTURING SAME

CROSS-REFERENCE TO RELATED APPLICATIONS

This application is a U.S. National Phase Application under 35 U.S.C. § 371 of International Patent Application No. PCT/KR2017/005002 filed on May 15, 2017, which claims foreign priority benefit under 35 U.S.C. § 119 of Korean Patent Application No. 10-2016-0106985 filed Aug. 23, 2016 in the Korean Intellectual Property Office, the contents of both of which are incorporated herein by reference.

TECHNICAL FIELD

The present disclosure relates to a rollable display device and a method of manufacturing the same, and more particularly, to a large rollable display device and a method of manufacturing the same.

BACKGROUND ART

Recently, display devices have continuously increased in size. The yield of a large display device noticeably decreases as a size of one display panel expands, which eventually results in a cost increase. For example, a large display device of about 100 inches costs five times as much as a medium-sized display device of about 50 inches whose size is half that of the large display device.

When a glass substrate is used as a base substrate of a large display device, the display device may weigh at least 100 kg due to its large size and may not be bent. Thus, it is difficult to move the large display device to other places.

DESCRIPTION OF EMBODIMENTS

Technical Problem

Provided is a large rollable display device that is lightweight, easily rolled and capable of improving productivity, and a method of manufacturing the large rollable display device.

Solution to Problem

According to an aspect of the present disclosure, a large rollable display device includes: a transparent cover having a first size, being transparent, and having flexibility; and a plurality of flexible display modules arranged spaced apart at first intervals on a rear surface of the transparent cover. Each of the plurality of flexible display modules includes: a primary flexible film that has a second size that is less than the first size, is transparent, and has flexibility; and a plurality of primary sub-flexible display modules arranged spaced apart at second intervals on a rear surface of the primary flexible film, and each of the plurality of primary sub-flexible display modules includes: a secondary flexible film that has a third size less than the second size, is transparent, and has flexibility; and a plurality of secondary sub-flexible display modules arranged spaced apart at third intervals on a rear surface of the secondary flexible film. Each of the plurality of secondary sub-flexible display modules may include: a tertiary flexible film that has a fourth size less than the third size, is transparent, and has flexibility; and a plurality of display chips arranged spaced apart at fourth intervals on a front surface of the tertiary flexible film.

The transparent cover may include a plurality of transparent flexible films that partially overlap the plurality of primary flexible films.

The tertiary flexible film may include a polyethylene terephthalate (PET) film.

The tertiary flexible film may include a same material as the secondary flexible film.

The plurality of primary sub-flexible display modules may adhere to rear surfaces of the primary flexible films, respectively.

The plurality of secondary sub-flexible display modules may adhere to rear surfaces of the secondary flexible films, respectively.

The plurality of flexible display modules may adhere to rear surfaces of adjacent transparent flexible films among the plurality of transparent flexible films.

The fourth intervals may be identical to the third intervals.

According to an aspect of the present disclosure, a method of manufacturing a large rollable display device includes: manufacturing a plurality of secondary sub-flexible display modules by arranging a plurality of display chips on a surface of a tertiary flexible film to be apart from each other at fourth intervals, the tertiary flexible film having a fourth size, being transparent, and having flexibility; manufacturing a plurality of primary sub-flexible display modules by arranging each of the plurality of secondary sub-flexible display modules on a surface of each of the plurality of secondary flexible films to be apart from each other at third intervals, the plurality of secondary flexible films each having a third size greater than the fourth size, being transparent, and having flexibility; manufacturing a plurality of flexible display modules by arranging each of the plurality of primary sub-flexible display modules on a surface of each of a plurality of primary flexible films to be apart from each other at second intervals, the plurality of primary flexible films each having a second size greater than the third size, being transparent, and having flexibility; and arranging a plurality of flexible display modules on a surface of a transparent cover to be apart from each other at first intervals, the transparent cover having a first size greater than the second size, being transparent, and having flexibility.

The arranging of the plurality of flexible display modules may include: making the plurality of flexible display modules, which are apart from each other at the first intervals, partially overlap a plurality of transparent flexible films; and arranging adjacent ones of the plurality of transparent flexible films to contact each other.

The tertiary flexible film may include a polyethylene terephthalate (PET) film.

The manufacturing of the plurality of secondary sub-flexible display modules may include roll-to-roll processing to prevent the tertiary flexible film from being deformed.

The manufacturing of the plurality of secondary sub-flexible display modules may be performed at a temperature less than or equal to 100° C.

Advantageous Effects of Disclosure

According to a large rollable display device and a method of manufacturing the same, in order to realize a large screen of 100 inches or more, processes of assembling flexible display modules, which are in smaller units than the large display device, are repeated. Thus, weight reduction and yield improvement of large rollable display devices of 100 inches or more may be achieved. In addition, the large rollable display device may be easily rolled by securing intervals between flexible display assembly units.

MODE OF DISCLOSURE

Figure 1A:
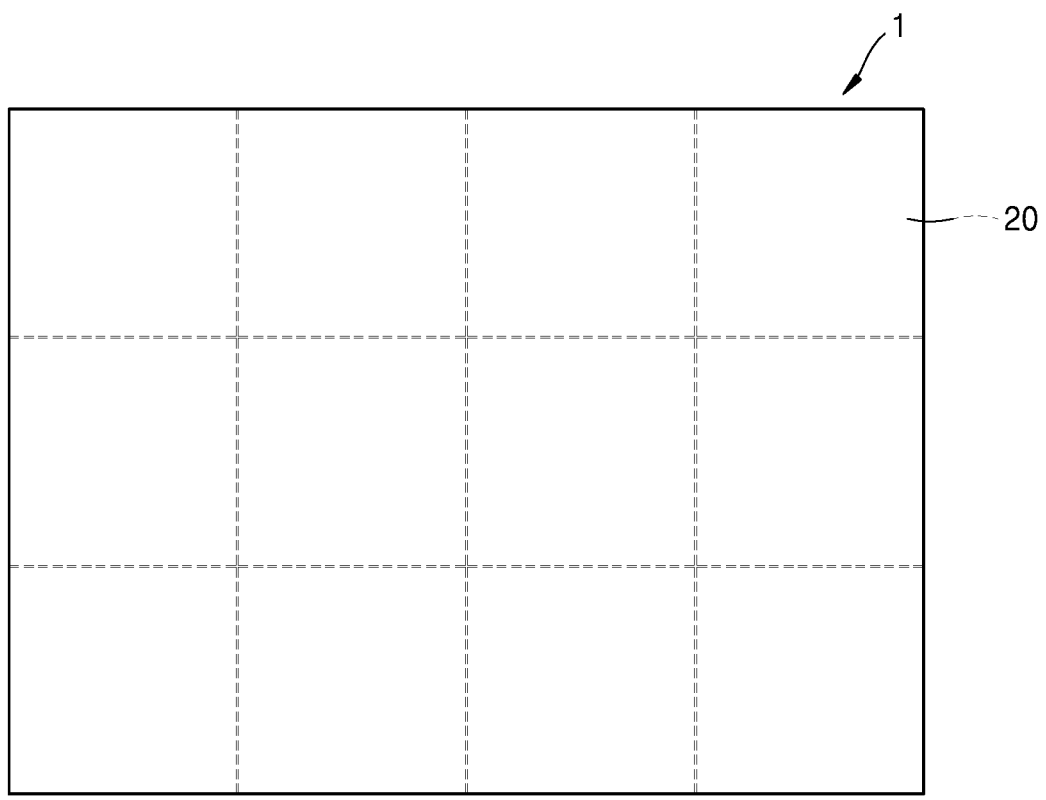
FIG. 1A is a front view of a large rollable display device according to an embodiment.

Hereinafter, configuration and effects of the present disclosure will be described in detail.

The terms used in the specification will be briefly described, and embodiments of the present disclosure will be described in detail.

The terms used in this specification are those general terms currently widely used in the art in consideration of functions regarding the present disclosure, but the terms may vary according to the intention of those of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the present disclosure.

Throughout the specification, when a portion "includes" an element, another element may be further included, rather than excluding the existence of the other element, unless otherwise described.

It will be understood that although the terms "first", "second", etc. may be used herein to describe various components, these components should not be limited by these terms. These components are only used to distinguish one component from another.

The present disclosure will now be described more fully with reference to the accompanying drawings, in which embodiments of the present disclosure are shown. The present disclosure may, however, be embodied in many different forms and should not be construed as being limited to the embodiments set forth herein; rather, these embodiments are provided so that this present disclosure will be thorough and complete, and will fully convey the concept of the present disclosure to those skilled in the art. For clarity, portions that are irrelevant to the description are omitted, and like reference numerals in the drawings denote like elements.

Figure 1B:
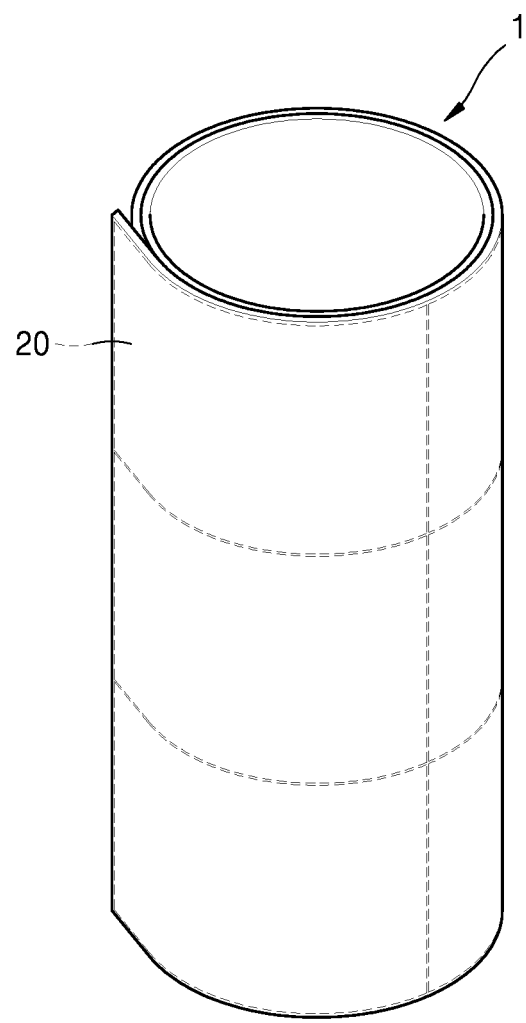
FIG. 1B is a perspective view showing a deformed shape of the large rollable display device of FIG. 1A.
Figure 2A:
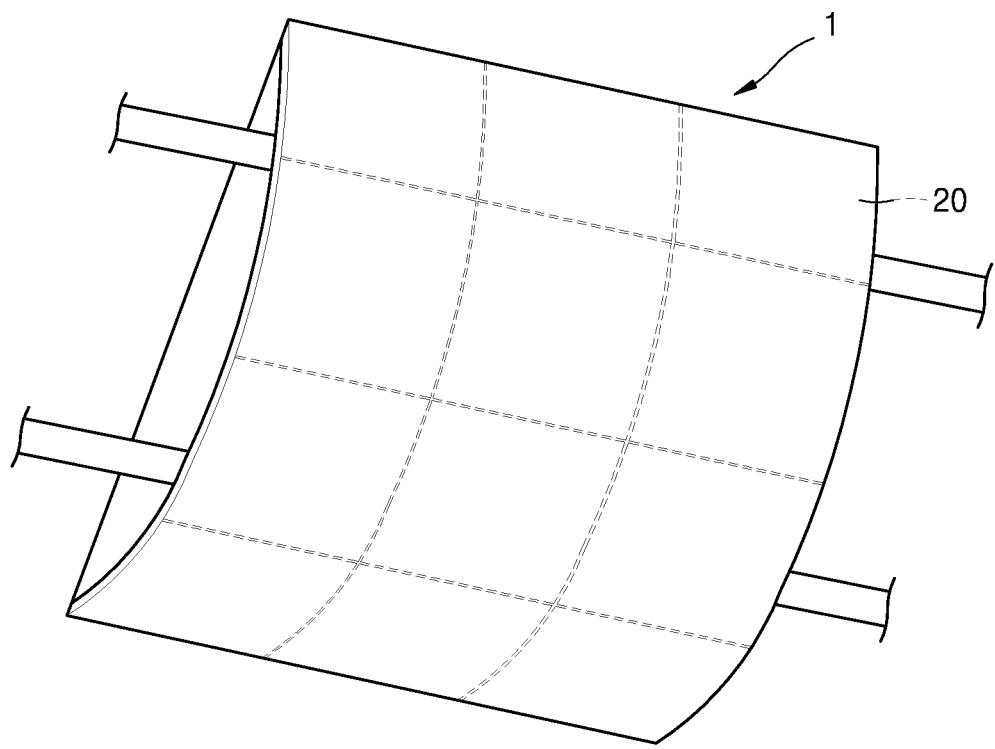
FIGS. 2A and 2B show states in which the large rollable display device of FIG. 1A is used.
Figure 2B:
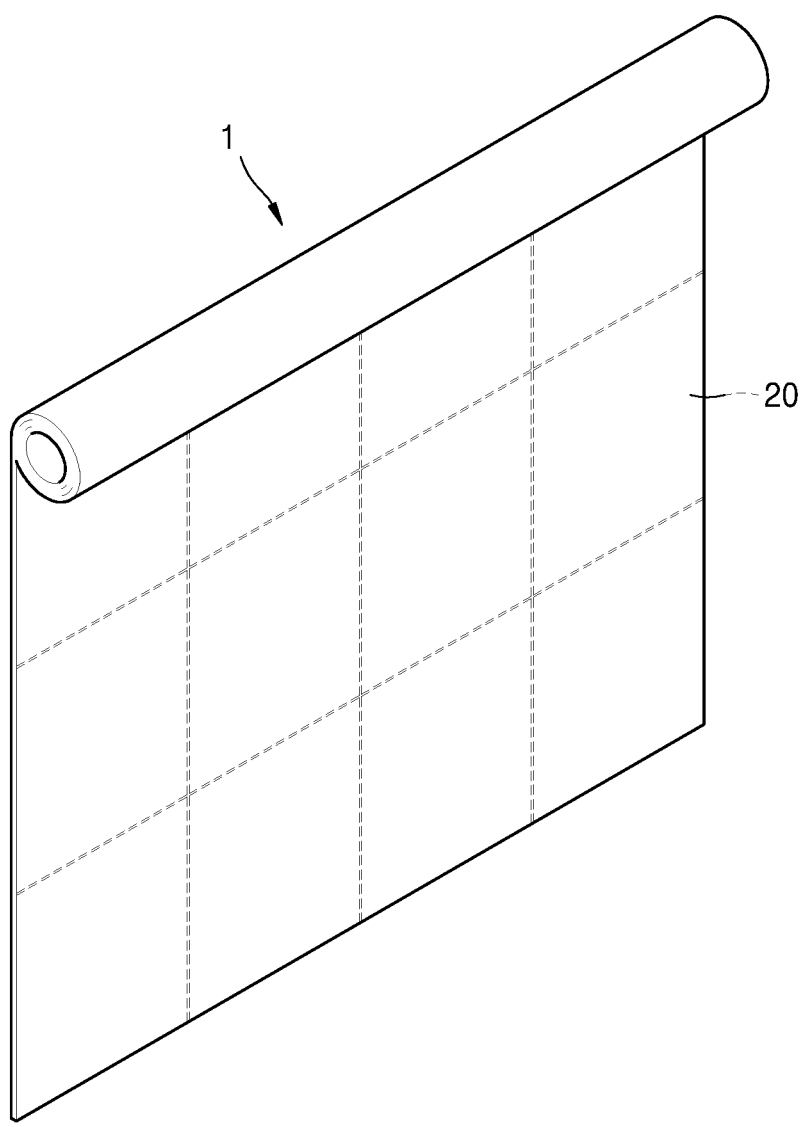

FIG. 1A is a front view of a large rollable display device 1 according to an embodiment. FIG. 1B is a perspective view showing a deformed shape of the large rollable display device 1 of FIG. 1A. FIGS. 2A and 2B show states in which the large rollable display device 1 of FIG. 1A is used.

Referring to FIGS. 1A and 1B, the large rollable display device 1 may be bent and wound into a roll. When the large rollable display device 1 is unrolled, a diagonal size of the large rollable display device 1 may be equal to or greater than 100 inches. The diagonal size of the large rollable display device 1 may be less than or equal to 1000 inches. However, the size of the large rollable display device 1 is not limited thereto, and the size may differ according to necessity.

As described, since the large rollable display device 1 having a great size may be rolled, the large rollable display device 1 may be easily transported and used for various purposes, compared to large display devices that are not rollable. For example, the large rollable display device 1 may be used while bent as shown in FIG. 2A or while partially unrolled as shown in FIG. 2B.

Figure 3A:
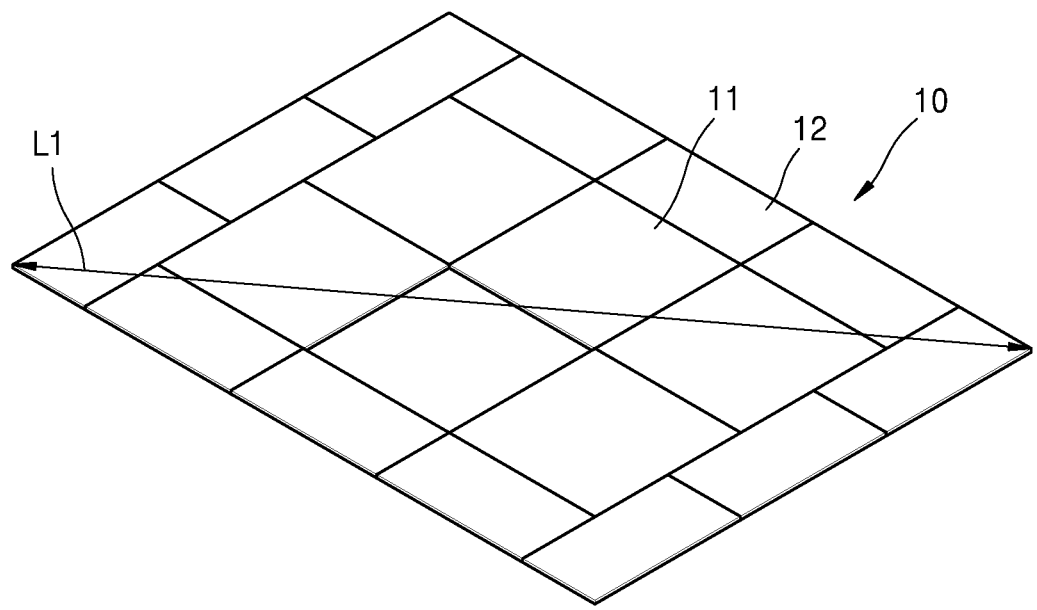
FIGS. 3A and 3B are respectively an exploded perspective view and a front view of a large rollable display device, according to an embodiment.
Figure 3A:
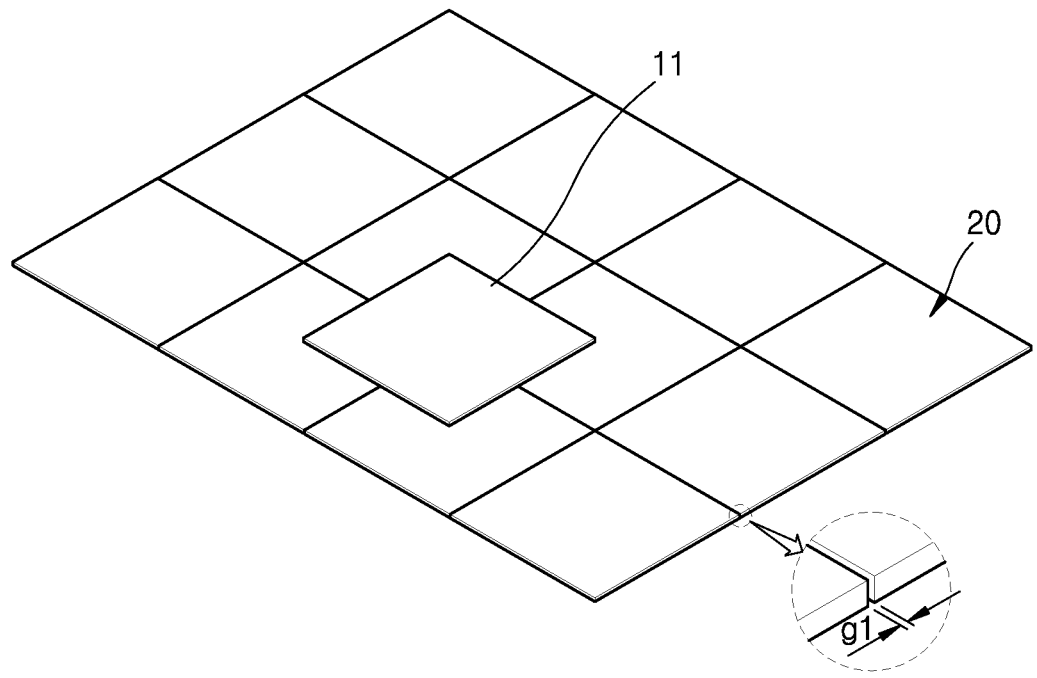
Figure 3B:
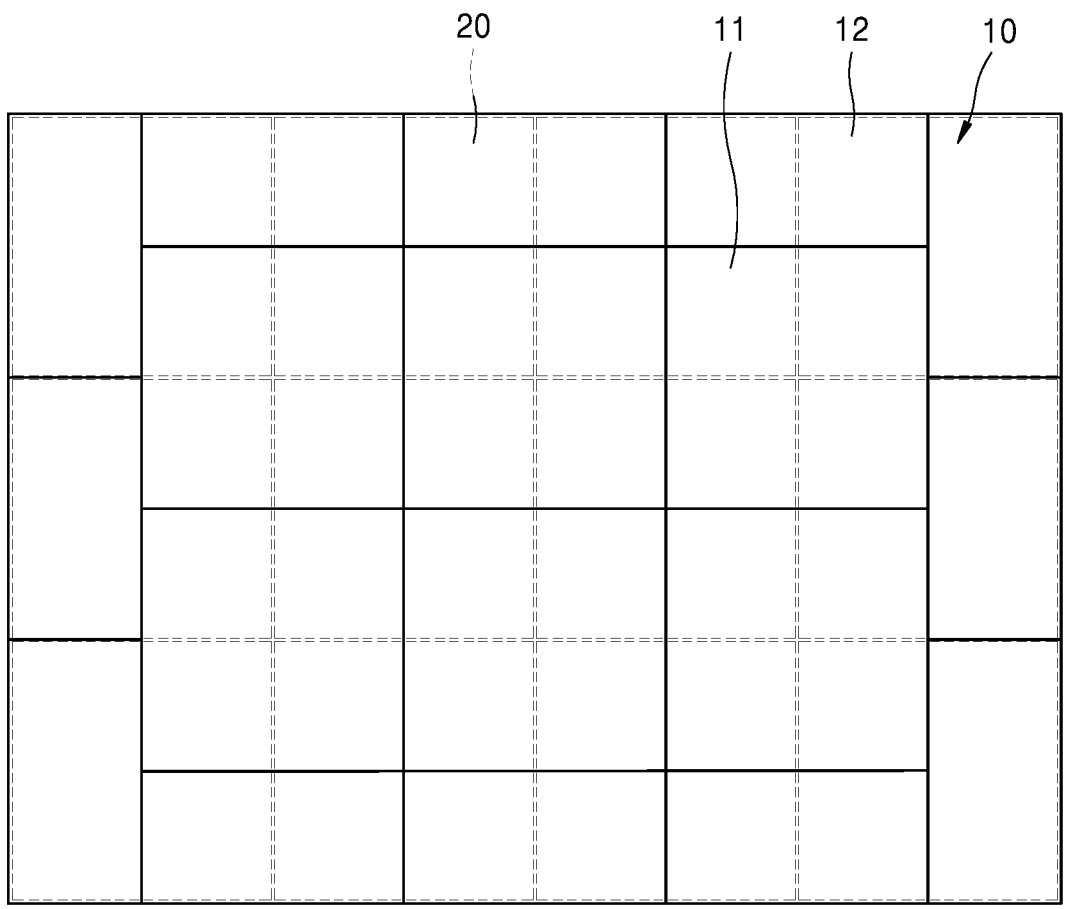

FIGS. 3A and 3B are respectively an exploded perspective view and a front view of the large rollable display device 1, according to an embodiment. Referring to FIGS. 3A and 3B, the large rollable display device 1 includes a transparent cover 10 and flexible display modules 20 arranged on a rear surface of the transparent cover 10. Although not shown, rear covers may be disposed on rear portions of the flexible display modules 20. Here, the term "rear surface" denotes a surface opposite to a front surface that faces a direction in which a user watches images.

The transparent cover 10 is transparent and has flexibility. Since the transparent cover 10 is transparent, images produced by the flexible display modules 20, which are disposed on the rear surface of the transparent cover 10, may be viewed by the user. The transparent cover 10 may also function as a protection film for protecting the flexible display modules 20 from the outside.

The transparent cover 10 has a first size L1. The first size L1 may be a diagonal size of the transparent cover 10. The first size L1 may be between about 100 inches and about 1000 inches. Having only one transparent cover 10 is good for the image quality of a display. However, when the transparent cover 10 has a size equal to or greater than a certain size, costs of the transparent cover 10 greatly increase. Accordingly, by considering the costs of the transparent cover 10, the transparent cover 10 may include multiple transparent flexible films 11 and 12 instead of including one transparent flexible film.

Each of the transparent flexible films 11 and 12 is transparent and has flexibility and may have a size less than the first size L1. For example, a length of one side of each of the transparent flexible films 11 and 12 may be less than or equal to about 100 cm.

For example, the transparent flexible films 11 and 12 may each be a polymer film. For example, the transparent flexible films 11 and 12 may each be a polyethylene terephthalate (PET) film. By using PET films as the transparent flexible films 11 and 12, the transparent flexible films 11 and 12 may have certain strength, and costs thereof may be reduced. It is because a PET film having a size less than or equal to about 100 cm is cheaper than other polymer films and a molecule bonding structure of PET has certain strength and is bendable.

However, materials of the transparent flexible films 11 and 12 are not limited thereto and may vary. For example, the transparent flexible films 11 and 12 may include polyimide (PI) or poly ethylene (PE).

The transparent flexible films 11 and 12 may have various shapes. For example, some transparent flexible films 11 may have square shapes, and other transparent flexible films 12 may have rectangular shapes. However, the shapes of the transparent flexible films 11 and 12 are not limited thereto. The transparent flexible films 11 and 12 may have identical shapes or at least three different shapes.

The transparent flexible films 11 and 12 are arranged to form one plane. The transparent flexible films 11 and 12 are seamlessly connected to adjacent transparent flexible films 11 and 12. For example, each of four side surfaces of one transparent flexible film 11 may contact one side surface of each of four transparent flexible films 11 and 12.

The flexible display modules 20 are arranged on the rear surface of the transparent cover 10. The flexible display modules 20 are arranged spaced apart from each other at first intervals g1. As the first intervals g1 are set to be less than or equal to certain intervals, the large rollable display device 1 may be easily bent, and influences on the image quality may be minimized. For example, the first intervals g1 may be less than or equal to about 3 mm.

The flexible display modules 20 may adhere to rear surfaces of the transparent flexible films 11 and 12. For example, the flexible display modules 20, which are spaced apart at the first intervals g1, may be fixed while partially overlapping the transparent flexible films 11 and 12.

For example, one transparent flexible film 11 overlaps and is attached to about ¼ area of each of four flexible display modules 20 spaced apart from each other. As the transparent flexible films 11 and 12 partially overlap and adhere to adjacent flexible display modules 20, the flexible display modules 20 are fixed and supported by the transparent cover 10.

By making the flexible display modules 20, whose sizes are less than the first size L1, overlap the transparent flexible films 11 and 12 so as to be fixed in front and rear directions, the extendibility of the large rollable display device 1 in horizontal and vertical directions may be strengthened, and the strength thereof may be reinforced.

Figure 4A:
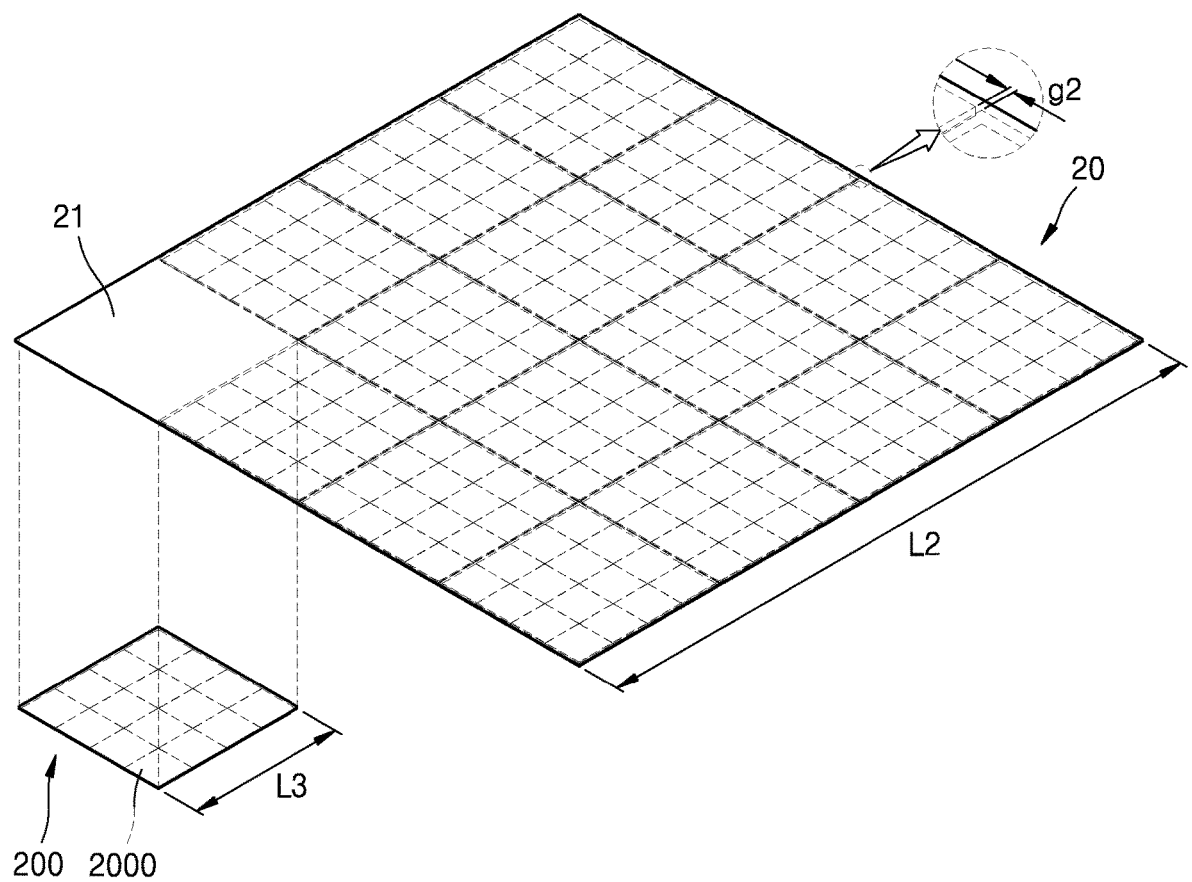
FIGS. 4A and 4B show flexible display modules of FIG. 3A.
Figure 4B:
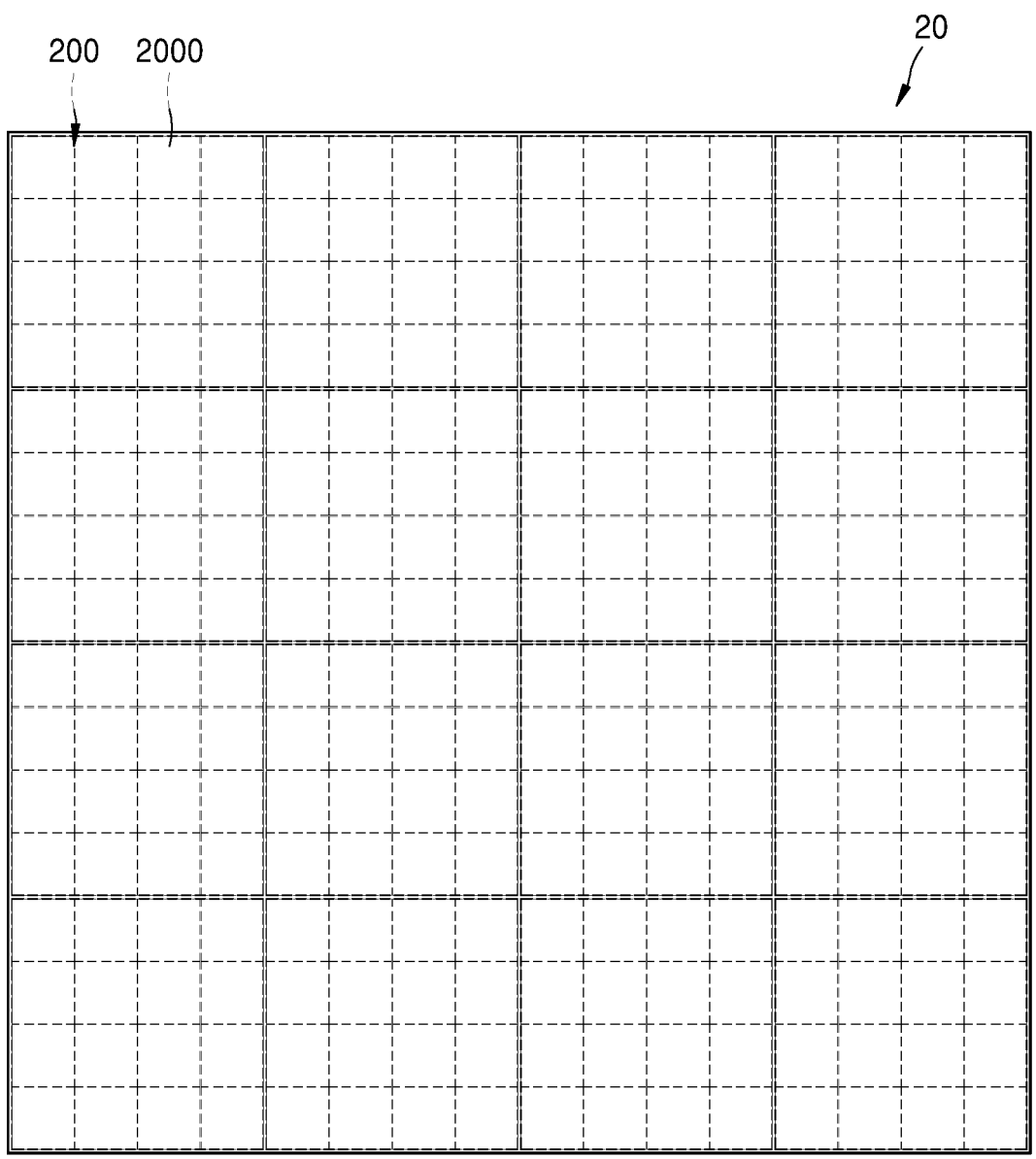

FIGS. 4A and 4B show the flexible display modules 20 of FIG. 3A. Referring to FIGS. 4A and 4B, one flexible display module 20 includes a primary flexible film 21 and primary sub-flexible display modules 200 arranged on a rear surface of the primary flexible film 21.

The primary flexible film 21 has a second size L2 less than the first size L1. The second size L2 may be less than or equal to about 100 cm. For example, a length of one side of the primary flexible film 21 may be less than or equal to about 100 cm.

The primary flexible film 21 may be transparent and have flexibility. For example, the primary flexible film 21 may be a polymer film. For example, the primary flexible film 21 may be a PET film. By using a PET film as the primary flexible film 21, the primary flexible film 21 may have certain strength, and costs thereof may be reduced. It is because a PET film having a size less than or equal to about 100 cm is cheaper than other polymer films and a molecule bonding structure of PET has certain strength and is bendable.

The primary flexible film 21 may include the same material as the transparent flexible films 11 and 12. However, materials of the primary flexible film 21 are not limited thereto and may vary. For example, the primary flexible film 21 may include PI or PE.

The primary sub-flexible display modules 200 may each have a third size L3 less than the second size L2 and may be arranged on the rear surface of the primary flexible film 21. The primary sub-flexible display modules 200 are arranged at second intervals g2. As the second intervals g2 are set to be less than or equal to certain intervals, the large rollable display device 1 may be easily bent, and the influences on the image quality may be minimized. For example, the second interval g2 may be less than or equal to about 3 mm.

The primary sub-flexible display modules 200 may adhere to the rear surface of the primary flexible film 21.

Figure 5A:
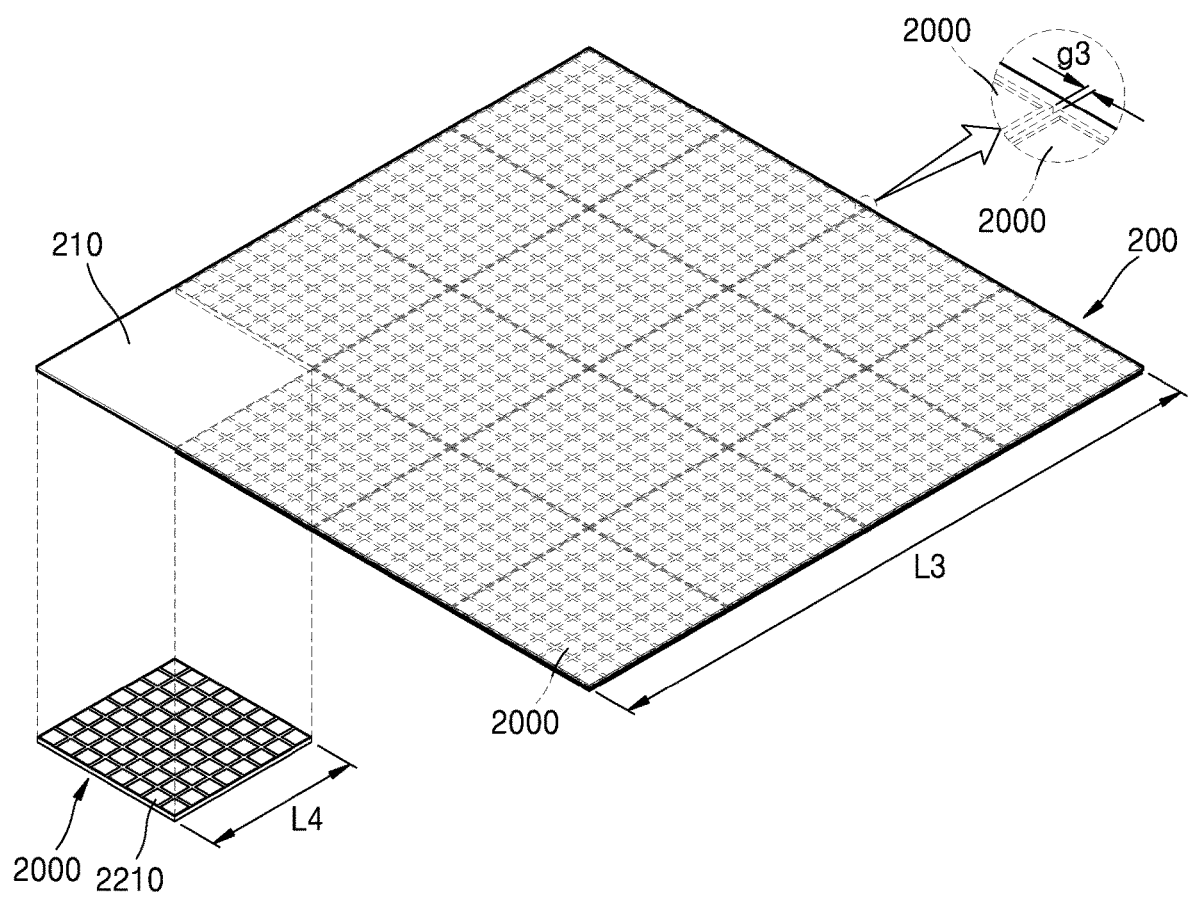
FIGS. 5A and 5B show primary sub-flexible display modules of FIG. 4A.
Figure 5B:
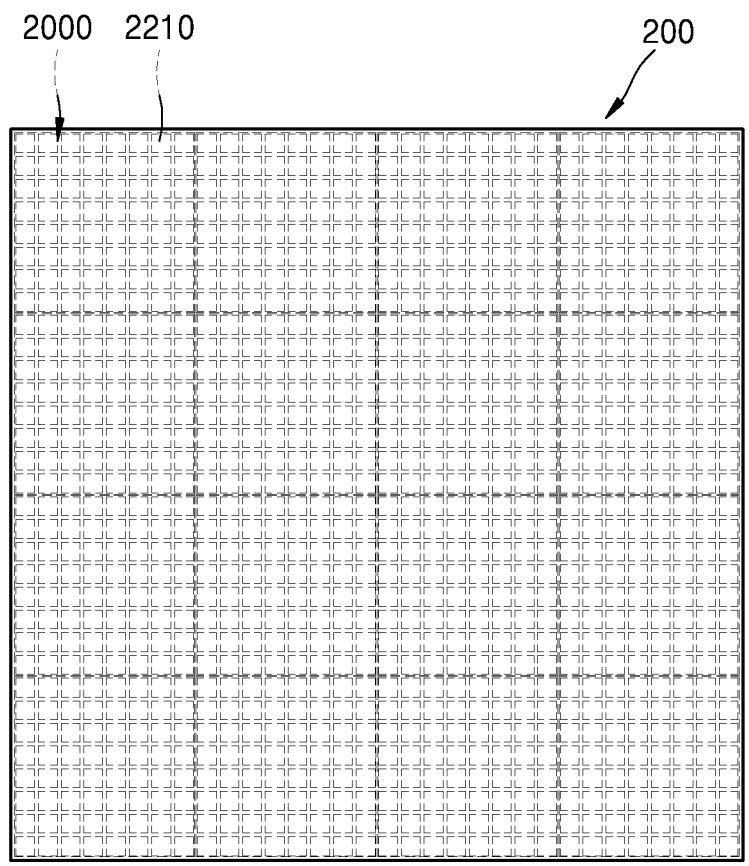

FIGS. 5A and 5B show the primary sub-flexible display modules 200 of FIG. 4A. Referring to FIGS. 5A and 5B, one primary sub-flexible display module 200 includes one secondary flexible film 210 and secondary sub-flexible display modules 2000 arranged on a rear surface of the secondary flexible film 210.

The secondary flexible film 210 may be transparent and bent and have the third size L3 less than the second size L2. Sizes of the primary sub-flexible display modules 200 are determined depending on the size of the secondary flexible film 210.

The secondary flexible film 210 may be transparent and have flexibility. For example, the secondary flexible film 210 may be a polymer film. For example, the secondary flexible film 210 may be a PET film. The secondary flexible film 210 may include the same material as the primary flexible film 21. However, materials of the secondary flexible film 210 are not limited thereto and may vary. For example, the secondary flexible film 210 may include PI or PE.

The secondary sub-flexible display modules 2000 may each have a fourth size L4 less than the third size L3 and are arranged spaced apart at third intervals g3 on the rear surface of the secondary flexible film 210. The fourth size L4 may be less than or equal to about 20 cm. For example, the fourth size L4 may be less than or equal to about 10 cm. A length of one side of the secondary sub-flexible display module 2000 may be less than or equal to about 10 cm.

As the third intervals g3 are set to be less than or equal to certain intervals, the large rollable display device 1 may be easily bent, and the influences on the image quality may be minimized. For example, the third intervals g3 may be less than or equal to about 3 mm.

The secondary sub-flexible display modules 2000 may adhere to the rear surface of the secondary flexible film 210.

Figure 6A:
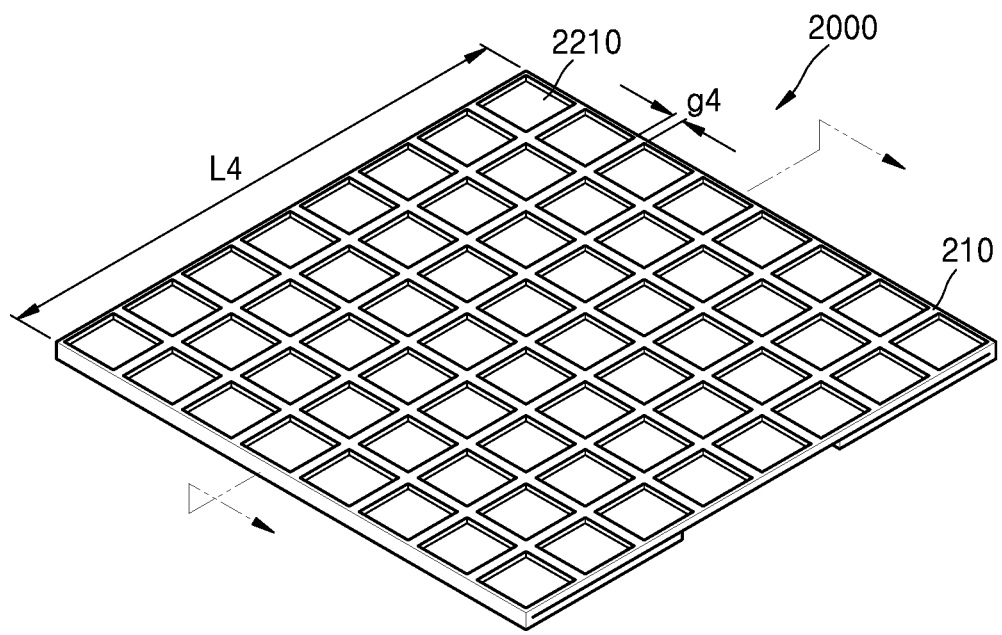
FIGS. 6A and 6B are respectively a perspective view and a cross-sectional view of secondary sub-flexible display modules of FIG. 5A.
Figure 6B:
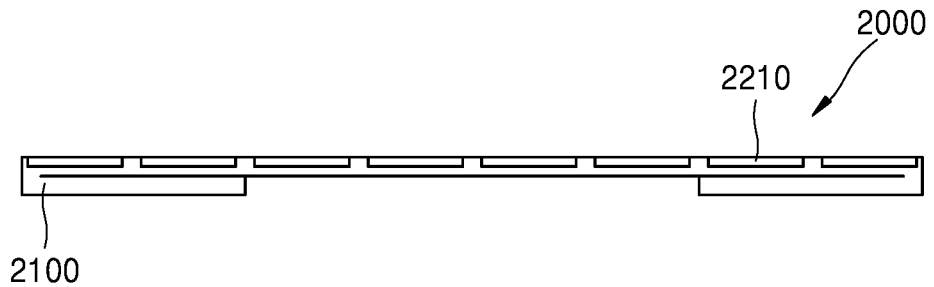

FIGS. 6A and 6B are respectively a perspective view and a cross-sectional view of the secondary sub-flexible display modules 2000 of FIG. 5A. Referring to FIGS. 6A and 6B, one secondary sub-flexible display module 2000 includes one tertiary flexible film 2100 and display chips 2210 arranged on a front surface of the tertiary flexible film 2100.

The tertiary flexible film 2100 may be transparent and bent. The tertiary flexible film 2100 that is bent has the fourth size L4 less than the third size L3. The size of the secondary sub-flexible display module 2000 may be determined depending on the size of the tertiary flexible film 2100.

The tertiary flexible film 2100 may be transparent and have flexibility. For example, the tertiary flexible film 2100 may be a polymer film. For example, the tertiary flexible film 2100 may be a PET film. To use the PET film as the tertiary flexible film 2100, processes of manufacturing the secondary sub-flexible display module 2000 may include roll-to-roll processing.

The PET film is easily deformed at a high temperature, for example, a temperature equal to or greater than 100° C. In the present embodiment, in consideration of the fact that, when the tertiary flexible film 2100 is a PET film, the tertiary flexible film 2100 is not usable during a deposition process, etc. performed at a high temperature, the secondary sub-flexible display modules 2000 may be manufactured by the roll-to-roll processing that is a low-temperature process. For example, the secondary sub-flexible display modules 2000 may be manufactured at a temperature less than or equal to 100° C.

However, materials of the tertiary flexible film 2100 are not limited thereto and may vary according to manufacturing methods. For example, the tertiary flexible film 2100 may include PI or PE.

The display chips 2210 each have a size less than the fourth size L4 and are arranged spaced apart at fourth intervals g4 on the front surface of the tertiary flexible film 2100. For example, the fourth intervals g4 may be less than or equal to about 3 mm. For example, the fourth intervals g4 may be less than or equal to about 2.5 mm.

At least some of the display chips 2210 may be inserted into the front surface of the tertiary flexible film 2100.

The display chip 2210 may be a light-emitting diode (LED) chip. However, the display chip 2210 is not limited thereto and may vary. For example, the display chip 2210 may be an organic light-emitting diode (OLED) chip.

Although not shown, driver integrated chips (ICs) for transmitting driving signals and data signals may be arranged on a rear surface of the tertiary flexible film 2100.

The third intervals g3 (refer to FIG. 5A) between secondary sub-flexible display modules 2000 may be identical to the fourth intervals g4 between the display chips 2210. Accordingly, the discontinuity of images produced by the secondary sub-flexible display modules 2000, which are spaced apart at the third intervals g3, may be minimized.

Figure 7:
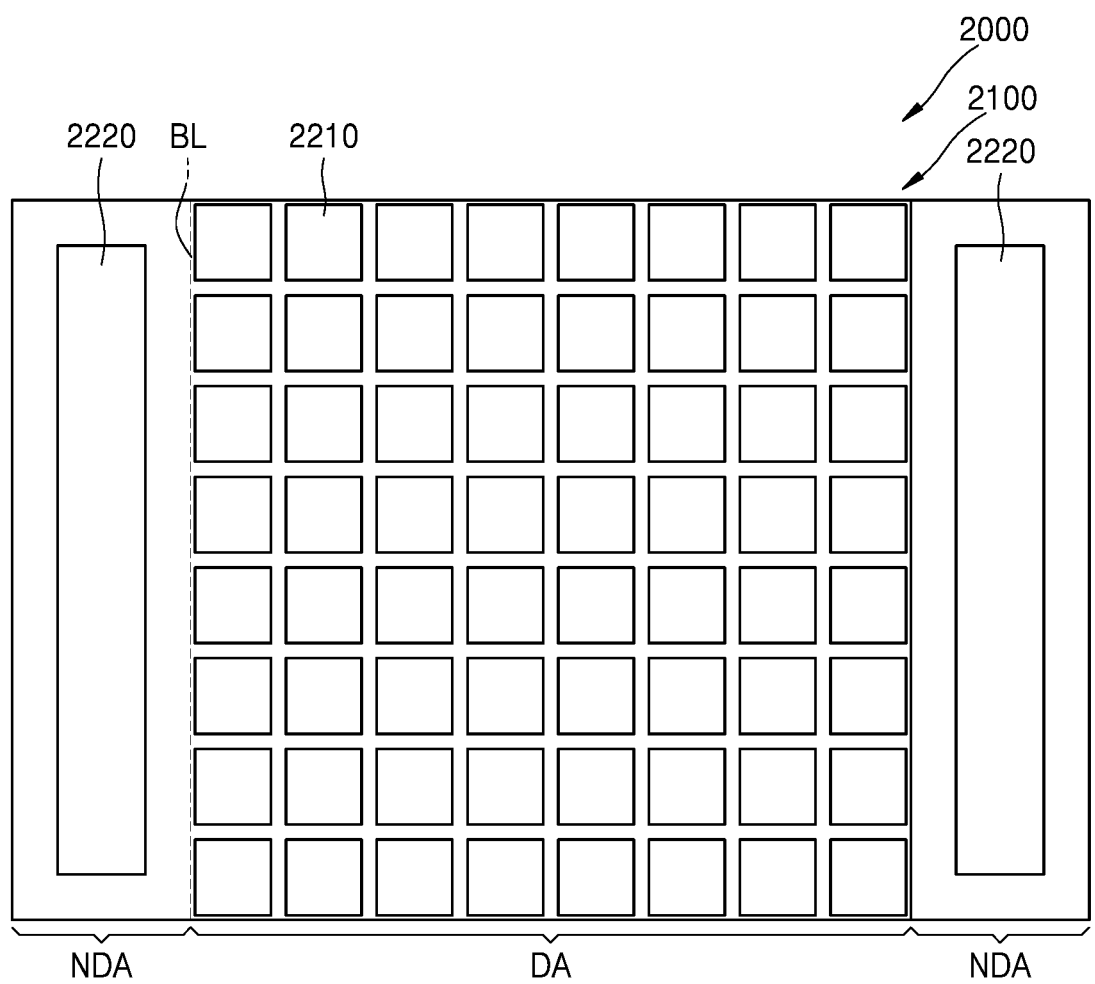
FIG. 7 is a development view for explaining a state before the secondary sub-flexible display module of FIG. 6A is folded.

FIG. 7 is a development view for explaining a state before the secondary sub-flexible display module 2000 of FIG. 6A is folded. Referring to FIGS. 6A and 7, the secondary sub-flexible display module 2000 includes a display area DA and non-display areas NDA. In the display area DA, the display chips 2210 may be disposed, and in the non-display areas NDA, driver ICs 2220 for driving the display chips 2210 may be disposed. The driver ICs 2220 may include a data driver, a scan driver, and the like. The display chips 2210 may be connected to the driver ICs 2220 by conductive connection lines (not shown).

The display chips 2210, the driver ICs 2220, and the conductive connection lines (not shown) may be formed on the tertiary flexible film 2100. For example, the display chips 2210, the driver ICs 2220, and the conductive connection lines may be formed on the same plane that is the tertiary flexible film 2100, by the roll-to-roll processing.

Then, the tertiary flexible film 2100 is bent with respect to a certain bending line BL to place the non-display areas NDA behind the display area DA. Thus, a bezel of the secondary sub-flexible display modules 2000 may be minimized, and the third intervals g3 between adjacent secondary sub-flexible display modules 2000 may be decreased to a certain level.

As described above, in order to implement a large screen of 100 inches or more in the large rollable display device 1 according to an embodiment, processes of assembling the flexible display modules 20 and the primary and secondary sub-flexible display modules 200 and 2000, which are smaller than the large screen, are performed at least three steps, thereby greatly enhancing the yield of the large rollable display device 1 having a size equal to or greater than about 100 inches.

When the large rollable display device 1 having the size equal to or greater than about 100 inches is realized on one film, the rate of partial failure increases in proportion to an increase in size. An increment in the rate of failure is much greater than that in size increase, which causes drastic decrease in the yield. Therefore, the large rollable display device 1 having a large screen of 100 inches or more costs five or ten times as much as a small- or medium-sized display device, for example, a display device having a 50-inch screen.

However, small- or medium-sized flexible display assemblies (the primary and secondary sub-flexible display modules 200 and 2000) having good yield are used in the large rollable display device 1 according to an embodiment, and thus the yield of the large rollable display device 1 having the large screen of 100 inches or more may be improved.

In addition, in the large rollable display device 1 according to an embodiment, the flexible display modules 20, the primary sub-flexible display modules 200, and the secondary sub-flexible display modules 2000 are arranged at the first intervals g1, the second intervals g2, and the third intervals g3, respectively, and thus the large rollable display device 1 may be easily wound into a roll.

Figure 8A:
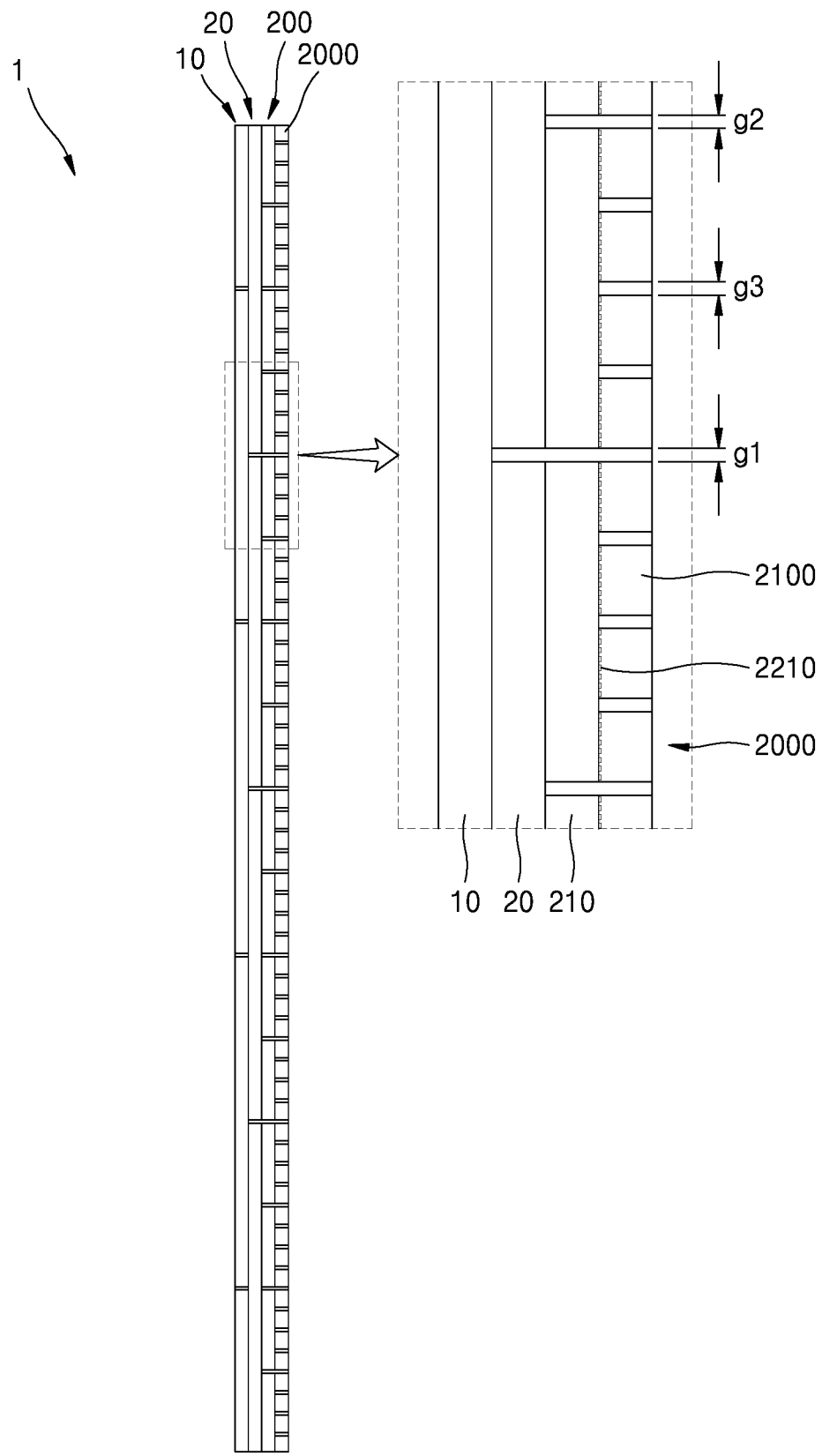
FIG. 8A is a cross-sectional view of the large rollable display device of FIG. 1A.
Figure 8B:
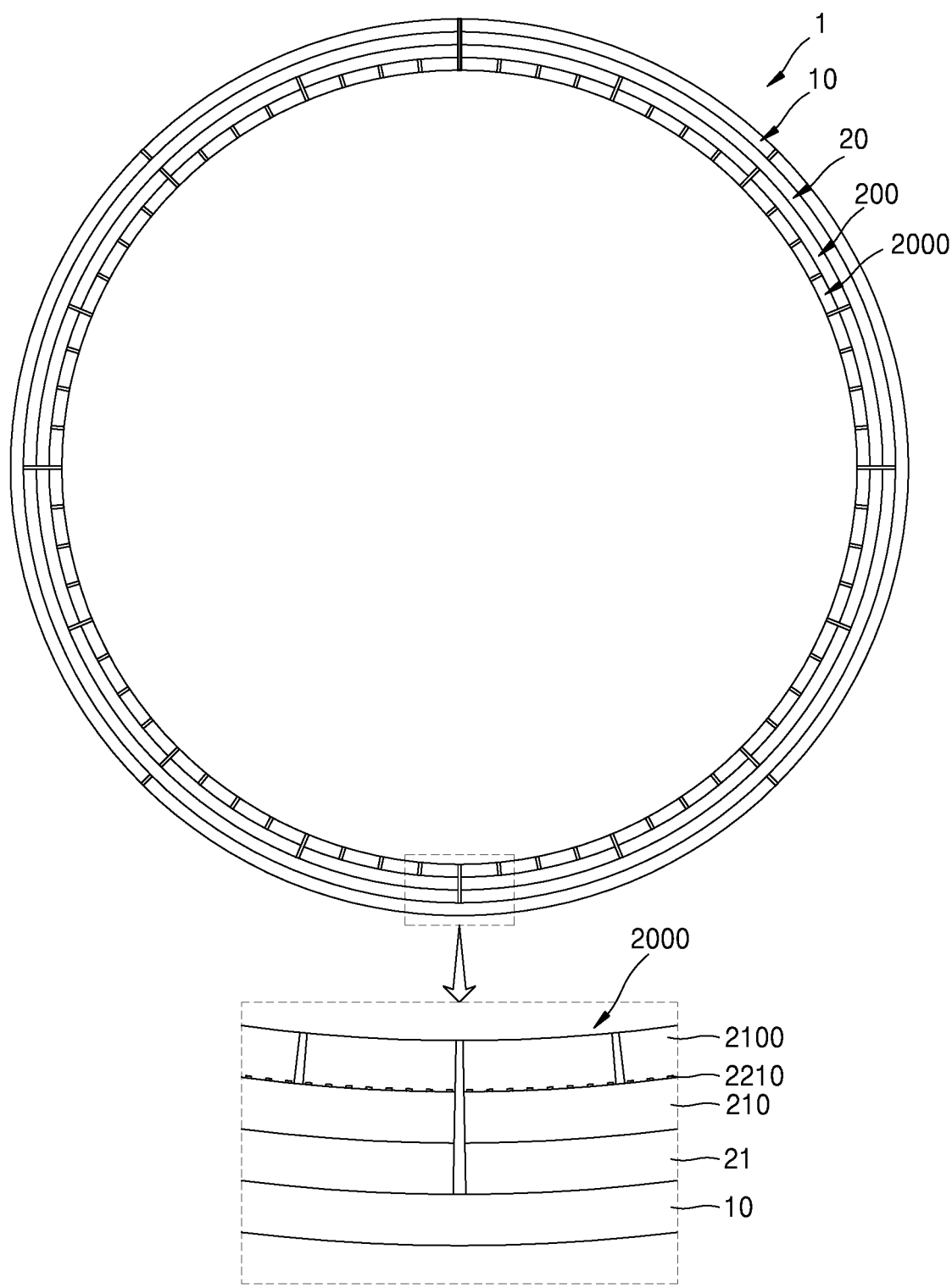
FIG. 8B is a cross-sectional view showing a state in which the large rollable display device of FIG. 8A is bent.

FIG. 8A is a cross-sectional view of the large rollable display device 1 of FIG. 1A. FIG. 8B is a cross-sectional view showing a state in which the large rollable display device 1 of FIG. 8A is bent.

Referring to FIG. 8A, in the large rollable display device 1, the transparent cover 10 including the transparent flexible films 11 and 12 is arranged in front, and the flexible display modules 20, which alternately overlap the transparent flexible films 11 and 12, are arranged on the rear surface of the transparent cover 10. The first intervals g1 between the flexible display modules 20 are covered by the transparent flexible films 11 and 12.

On each flexible display module 20, the primary flexible film 21 and the primary sub-flexible display modules 200, which are spaced apart from each other at the second intervals g2 on the rear surface of the primary flexible film 21, are disposed.

On each primary sub-flexible display module 200, the secondary flexible film 210 and the secondary sub-flexible display modules 2000, which are spaced apart from each other at the third intervals g3 on the rear surface of the secondary flexible film 210, are disposed.

A thickness of the large rollable display device 1 in the front and rear directions may range from about 30 um to about 100 um.

Referring to FIG. 8B, as the large rollable display device 1 is bent, the first intervals g1 between the flexible display modules 20, the second intervals g2 between the primary sub-flexible display modules 200, and the third intervals g3 between the secondary sub-flexible display modules 2000 may decrease. Accordingly, the large rollable display device 1 may be easily wound into a roll.

Referring back to FIG. 8A, the discontinuity that the user may sense while viewing a large screen may be minimized by setting the fourth intervals g4 between the display chips 2210 to be identical to the first, second, and third intervals g1, g2, and g3.

Figure 9:
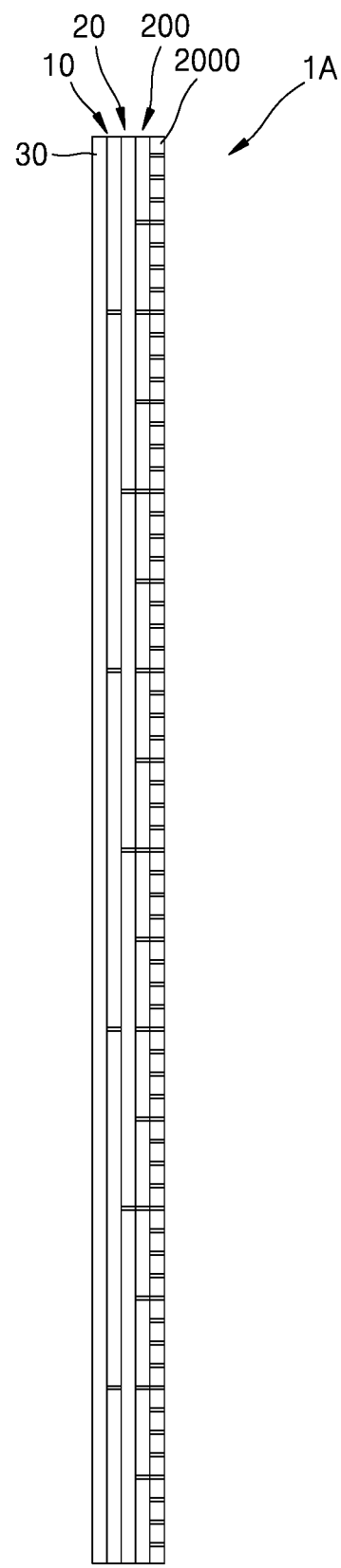
FIG. 9 is a cross-sectional view of a large rollable display device according to another embodiment.

Although not shown, patterns for improving the image quality provided by the flexible display modules 20 may be formed on the transparent cover 10. For example, protruding patterns may be formed on the front or rear surface of the transparent cover 10. However, the patterns are not limited thereto. Such patterns may be formed on a separate sheet 30 of a large rollable display device 1A of FIG. 9.

Figure 10:
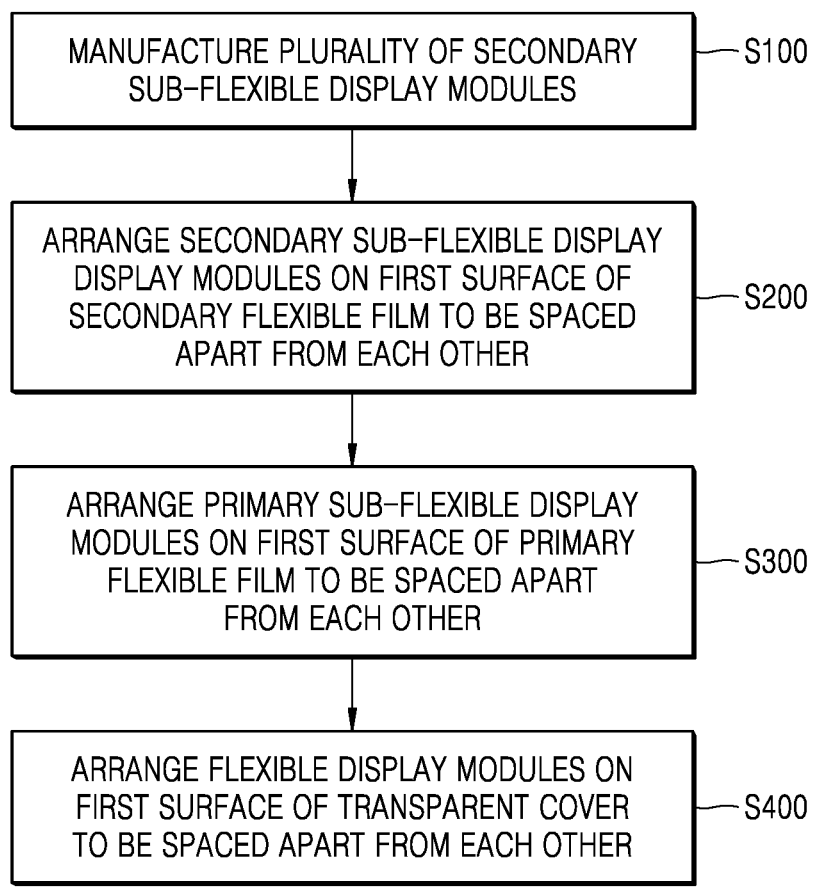
FIG. 10 is a flowchart of processes of manufacturing a large rollable display device, according to an embodiment.

FIG. 10 is a flowchart of processes of manufacturing the large rollable display device 1, according to an embodiment.

Referring to FIGS. 7 and 10, the display chips 2210 are arranged spaced apart at the fourth intervals g4 on the front surface of the tertiary flexible film 2100 having the fourth size L4, thus manufacturing the secondary sub-flexible display modules 2000. By repeating the above process, the secondary sub-flexible display modules 2000 are manufactured in operation S100.

To manufacture the secondary sub-flexible display modules 2000, a process of arranging the display chips 2210 on the tertiary flexible film 2100 includes the roll-to-roll processing.

Since it is possible to perform the above process by the roll-to-roll processing at a low temperature, for example, at a temperature less than or equal to 100° C., a PET film that is vulnerable to heat may be used as the tertiary flexible film 2100.

Referring to FIGS. 5A and 10, the secondary sub-flexible display modules 2000 are arranged spaced apart at the third intervals g3 on the rear surface of the secondary flexible film 210 having the third size L3 greater than the fourth size L4, thereby manufacturing the primary sub-flexible display modules 200. By repeating the above process, the primary sub-flexible display modules 200 are manufactured in operation S200.

Referring to FIGS. 4A and 10, the primary sub-flexible display modules 200 are arranged spaced apart at the second intervals g2 on the rear surface of the primary flexible film 21 having the second size L2 greater than the third size L3, thereby manufacturing the flexible display modules 20 in operation S300. By repeating the above process, the flexible display modules 20 are manufactured.

Referring to FIGS. 3A and 10, the flexible display modules 20 are arranged spaced apart at the first intervals g1 on the rear surface of the transparent cover 10 having the first size L1 greater than the second size L2, in operation S400.

In operation of arranging the flexible display modules 20 to be spaced apart from each other, the flexible display modules 20, which are spaced apart at the first intervals g1, partially overlap the transparent flexible films 11 and 12. In this case, adjacent transparent flexible films 11 and 12 may contact each other and may be seamlessly connected to each other.

In the above embodiments, the large rollable display device 1 is assembled in total three steps: the first step to arrange the secondary sub-flexible display modules 2000 that are in small units; the second step to arrange the primary sub-flexible display modules 200 that are in medium units; and the third step to arrange the flexible display modules 20 that are in great units. However, the manufacturing processes are not limited thereto. The manufacturing processes may be appropriately changed according to necessity. For example, the the large rollable display device 1 may be assembled in total two steps or four or more steps.

In addition, in the above embodiments, the flexible display modules 20, the primary sub-flexible display modules 200, and the secondary sub-flexible display modules 2000 have the same size and shape, that is, the square shape. However, the aforementioned size and shape are merely examples, and it will be understood by those of ordinary skill in the art that various changes in form and details may be made herein. For example, at least one of the flexible display modules 20, the primary sub-flexible display modules 200, and the secondary sub-flexible display modules 2000 may have a different size or shape.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The invention claimed is:

1. A large rollable display device comprising:
a transparent cover having a first size, being transparent, and having flexibility; and
a plurality of flexible display modules arranged spaced apart at first intervals on a rear surface of the transparent cover, and
each of the plurality of flexible display modules comprises:
a primary flexible film that has a second size that is less than the first size, is transparent, and has flexibility; and
a plurality of primary sub-flexible display modules arranged spaced apart at second intervals on a rear surface of the primary flexible film, and
each of the plurality of primary sub-flexible display modules comprises:
a secondary flexible film that has a third size less than the second size, is transparent, and has flexibility; and
a plurality of secondary sub-flexible display modules arranged spaced apart at third intervals on a rear surface of the secondary flexible film.

2. The large rollable display device of claim 1, wherein each of the plurality of secondary sub-flexible display modules comprises:
a tertiary flexible film that has a fourth size less than the third size, is transparent, and has flexibility; and
a plurality of display chips arranged spaced apart at fourth intervals on a front surface of the tertiary flexible film.

3. The large rollable display device of claim 1, wherein the transparent cover comprises a plurality of transparent flexible films that partially overlap the plurality of primary flexible films.

4. The large rollable display device of claim 2, wherein the tertiary flexible film comprises a polyethylene terephthalate (PET) film.

5. The large rollable display device of claim 2, wherein the tertiary flexible film comprises a same material as the secondary flexible film.

6. The large rollable display device of claim 1, wherein the plurality of primary sub-flexible display modules adhere to rear surfaces of the primary flexible films, respectively.

7. The large rollable display device of claim 2, wherein the plurality of secondary sub-flexible display modules adhere to rear surfaces of the secondary flexible films, respectively.

8. The large rollable display device of claim 3, wherein the plurality of flexible display modules adhere to rear surfaces of adjacent transparent flexible films among the plurality of transparent flexible films.

9. The large rollable display device of claim 2, wherein the fourth intervals are identical to the third intervals.

10. A method of manufacturing a large rollable display device, the method comprising:
manufacturing a plurality of secondary sub-flexible display modules by arranging a plurality of display chips on a surface of a tertiary flexible film to be apart from each other at fourth intervals, the tertiary flexible film having a fourth size, being transparent, and having flexibility;

manufacturing a plurality of primary sub-flexible display modules by arranging each of the plurality of secondary sub-flexible display modules on a surface of each of the plurality of secondary flexible films to be apart from each other at third intervals, the plurality of secondary flexible films each having a third size greater than the fourth size, being transparent, and having flexibility;

manufacturing a plurality of flexible display modules by arranging each of the plurality of primary sub-flexible display modules on a surface of each of a plurality of primary flexible films to be apart from each other at second intervals, the plurality of primary flexible films each having a second size greater than the third size, being transparent, and having flexibility; and arranging a plurality of flexible display modules on a surface of a transparent cover to be apart from each other at first intervals, the transparent cover having a first size greater than the second size, being transparent, and having flexibility.

11. The method of claim 10, wherein the arranging of the plurality of flexible display modules comprises:

making the plurality of flexible display modules, which are apart from each other at the first intervals, partially overlap a plurality of transparent flexible films; and arranging adjacent ones of the plurality of transparent flexible films to contact each other.

12. The method of claim 10, wherein the tertiary flexible film comprises a polyethylene terephthalate (PET) film.

13. The method of claim 12, wherein the manufacturing of the plurality of secondary sub-flexible display modules comprises roll-to-roll processing to prevent the tertiary flexible film from being deformed.

14. The method of claim 13, wherein the manufacturing of the plurality of secondary sub-flexible display modules is performed at a temperature less than or equal to 100° C.

* * * * *